US007801701B2

(12) United States Patent
Mayer

(10) Patent No.: US 7,801,701 B2
(45) Date of Patent: Sep. 21, 2010

(54) INSERTER INTEGRATED METHOD AND SYSTEM FOR LOGIC ANALYZING ERROR CONDITIONS

(75) Inventor: Paul Mayer, Sandy Hook, CT (US)

(73) Assignee: Pitney Bowes Inc., Stamford, CT (US)

( * ) Notice: Subject to any disclaimer, the term of this patent is extended or adjusted under 35 U.S.C. 154(b) by 869 days.

(21) Appl. No.: 11/607,411

(22) Filed: Dec. 1, 2006

(65) Prior Publication Data

US 2008/0133043 A1 Jun. 5, 2008

(51) Int. Cl.
*G06F 19/00* (2006.01)

(52) U.S. Cl. ....................................... 702/183; 700/110

(58) Field of Classification Search .......... 700/221–223
See application file for complete search history.

(56) References Cited

U.S. PATENT DOCUMENTS 5,003,485 A * 3/1991 Francisco .................... 700/221
5,941,516 A * 8/1999 Emigh et al. ............. 270/58.06
6,625,567 B1 * 9/2003 McMahan .................... 702/179
6,636,813 B1 * 10/2003 Isobe et al. .................... 702/34

* cited by examiner

*Primary Examiner*—Manuel L Barbee
(74) *Attorney, Agent, or Firm*—Michael J. Cummings; Angelo N. Chaclas

(57) ABSTRACT

An integrated logic analyzer system that provides enhanced troubleshooting capabilities for an inserter machine. The system includes sensors positioned within the inserter machine. A controller is coupled to the sensors, and also provides control signals for operation of the machine. The controller generates error signals upon the occurrence of predetermined instances of sensor signals. A display coupled to the controller indicates machine status based on the signals from the plurality of sensors. An integrated logic analyzer is also coupled to the controller and to the plurality of sensors. The integrated logic analyzer provides a continuous readout of sensor signals from the sensors, and control and status signals from the controller. The controller provides a representation of the continuous readout to the display. In the preferred embodiment, the controller provides a visual representation of individually selectable modules of the inserter system. Machine status, from the controller, is displayed as vertical lines overlaying continuous readout at various points in time. In the preferred embodiments, the integrated logic analyzer further provides a continuous readout of control signals from the controller.

20 Claims, 4 Drawing Sheets

INSERTER INTEGRATED METHOD AND SYSTEM FOR LOGIC ANALYZING ERROR CONDITIONS

TECHNICAL FIELD

The present invention relates to an enhancement to an inserter system for better interpreting inserter performance data and diagnosing problems.

BACKGROUND OF THE INVENTION

Inserter systems, such as those applicable for use with the present invention, are typically used by organizations such as banks, insurance companies and utility companies for producing a large volume of specific mailings where the contents of each mail item are directed to a particular addressee. Also, other organizations, such as direct mailers, use inserts for producing a large volume of generic mailings where the contents of each mail item are substantially identical for each addressee. Examples of such inserter systems are the 8 series, 9 series, and APS™ inserter systems available from Pitney Bowes Inc. of Stamford, Conn.

In many respects, the typical inserter system resembles a manufacturing assembly line. Sheets and other raw materials (other sheets, enclosures, and envelopes) enter the inserter system as inputs. Then, a plurality of different modules or workstations in the inserter system work cooperatively to process the sheets until a finished mail piece is produced. The exact configuration of each inserter system depends upon the needs of each particular customer or installation.

Typically, inserter systems prepare mail pieces by gathering collations of documents on a conveyor. The collations are then transported on the conveyor to an insertion station where they are automatically stuffed into envelopes. After being stuffed with the collations, the envelopes are removed from the insertion station for further processing. Such further processing may include automated closing and sealing the envelope flap, weighing the envelope, applying postage to the envelope, and finally sorting and stacking the envelopes.

Servicing a high speed paper handling device, such as an inserter machine, is often difficult because it is difficult to see what causes jams, or other paper handling issues. This is particularly true as the speeds of the paper transports exceed 100 inches per second, as is often the case in inserter machines. The current "state of the art" is to use special high speed camera hardware to record the motion of paper and then play it back at low speed. This hardware is very expensive, bulky and cannot be shipped to customer sites easily. Further, setting up cameras and special lighting for these systems is not a simple skill. This is further compounded by the fact that paper paths are becoming more enclosed and hence using a camera may not be an option in some cases.

Another analysis technique is to attach a logic analyzer to points in the inserter module to try to detect electronic signals that might give clues to what is happening while the problems are happening. However, this analysis is very technically demanding and many service technicians may not be have the engineering capability analyze graphs output by the logic analyzer. Such analysis is more typically performed by a design engineer.

Accurately and efficient resolution of paper handling problems in the field is key to customer satisfaction and retention in the production mail business. The need to consult offsite engineering personnel can negatively impact the time needed to resolve a problem, and unproductive machine time can lead to financial losses for the user of the inserter machine.

SUMMARY OF THE INVENTION

The present invention represents an improvement over the prior art by providing an integrated logic analyzer system that provides enhanced troubleshooting capabilities. The improvement described here seeks provide an integrated and simple mechanism for service engineers to find the root cause of paper jams without requiring the use of special hardware. Graphs of behavior on the "time domain" (i.e. timing diagrams), as provided by the integrated logic analyzer, can be more easily interpreted and acted upon by skilled service technicians.

The system includes sensors positioned within the inserter machine to sense conditions at the sensors. A controller is coupled to the sensors, and provides control signals for operation of the machine. The controller generates error signals upon the occurrence of predetermined instances of sensor signals. A display coupled to the controller indicates machine status based on the signals from the plurality of sensors.

An integrated logic analyzer is coupled to the controller and to the plurality of sensors. The integrated logic analyzer provides a continuous readout of sensor signals from the sensors, and control and status signals from the controller. The controller provides a representation of the continuous readout from the integrated logic analyzer to the display.

In the preferred embodiment, the controller provides a visual representation of modules of the inserter system, and the continuous readouts for particular modules are individually selectable. Also, the continuous readouts are preferably displayed as a function of time on a horizontal axis. Machine status is displayed as vertical lines overlaying the continuous readout at various points in time. The vertical lines may represent a point in time when the machine starts, or a point in time when an error signal occurs. Preferably, the vertical lines are color coded: for example green for machine start, and red for an error signal.

In a further enhanced embodiment, the system further provides a tool for horizontal time measurement between points chosen by an operator. In the preferred embodiments, the integrated logic analyzer further provides a continuous readout of control signals from the controller. Exemplary control signals include motor control signals and actuator control signals.

Further details of the present invention are provided in the accompanying drawings, detailed description, and claims.

DETAILED DESCRIPTION

Figure 1:
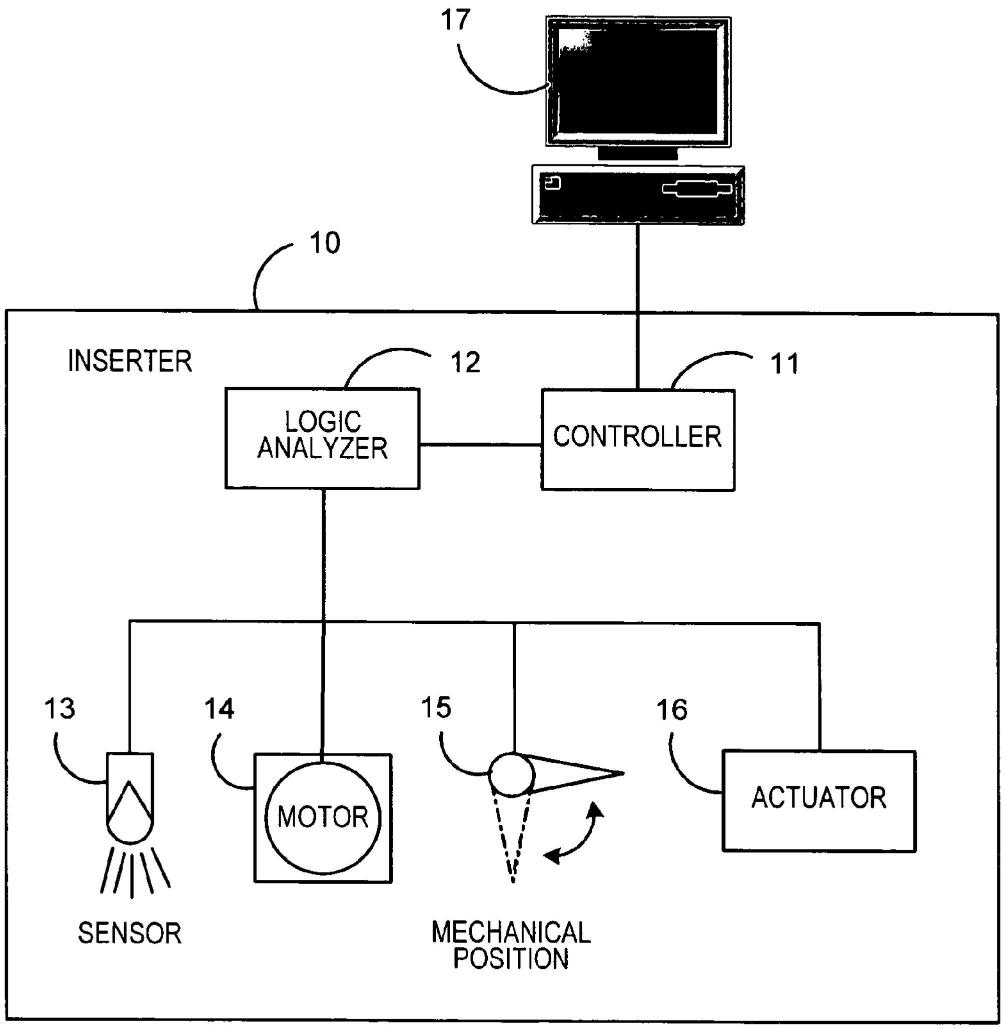
FIG. 1 is a diagram showing the relationship of the logic analyzer to other components of an inserter machine.

FIG. 1 depicts an exemplary arrangement for integrating a logic analyzer 12 into an inserter system 10. In this arrangement, logic analyzer 12 is coupled to a variety of components that provide inserter 10 operational information. Sensor 13 represents a typical LED optical sensor that is typically used in an inserter system. Optical sensor 13 detects the presence or absence of a sheet at a location by determining whether an optical beam has been interrupted by a sheet. Leading and trail edges of sheets can also be detected by the optical sensor 13 by detecting the transitions of the sensor from one state to another.

Motor 14 is representative of a typical device used for driving the sheets through the inserter system. A typical motor 14 will be comprised of a servo motor. The signal provided from the motor 14 may typically be whether the motor is in an active or inactive state. Alternatively, encoders sensors are commonly attached to servo motors, and such encoders are useful for determining a position, or rotary displacement, of the motor, and from which further information such as speeds and accelerations can be derived.

Mechanical device 15 exemplifies devices such as deflectors that have different mechanical positions at different times. An exemplary deflector device is used in a dual accumulator having two bins for gathering accumulations of documents. While one bin is being emptied with a completed accumulation, the other bin can be used for accumulating sheets for a next mail piece. A mechanical flipper guides sheets to the appropriate accumulator bin. The data provided to the logic analyzer 12 is indicative of the mechanical position of the device, for example whether the position is set for a first or a second accumulator bin.

Similar to mechanical device 15, actuator 16 is indicative of the position of a mechanical device in the system. For example, in an accumulator, and actuator 16 can be used to drive the raising and lowering of a stop for assisting in accumulation of sheets.

Logic analyzer 12 and controller 11 also provide data to one another. Controller 11 provides information about instructions and conditions with the machine. The integration of the controller 11 with the sensor information in the logic analyzer 12 is a distinct advantage of the preferred embodiment. For example, the controller 11 can tell the logic analyzer 12 when the machine, or a particular component, has been instructed to begin operation. This controller 11 operational information can then be overlaid in the logic analyzer 12 with the actual sensed conditions to better understand a sequence of events.

As another example, the controller 11 tells logic analyzer 12 when an alarm condition occurs. Thus, when this information is combined in the logic analyzer 12 the user has access to the full range of relevant information presented in a format that is condensed and useful. By observing the side-by-side sensor signals at the time of an error signal, one can more accurately recreate the series of events that may have led to the problem.

For purposes of this invention, there are no limitations on whether the logic analyzer 12 must housed in a separate unit, or run on a separate computer processor. In the preferred embodiment, the logic analyzer 12 is a separate unit that is coupled to a control computer with an inserter operating system, such as Direct Connect from Pitney Bowes Inc. However, the relevant functionality can be performed on either, or just one, processor without affecting the invention. Thus the distinction between logic analyzer 12 and the controller 11 is based on programming and functionality, rather than any physical device.

Figure 2:
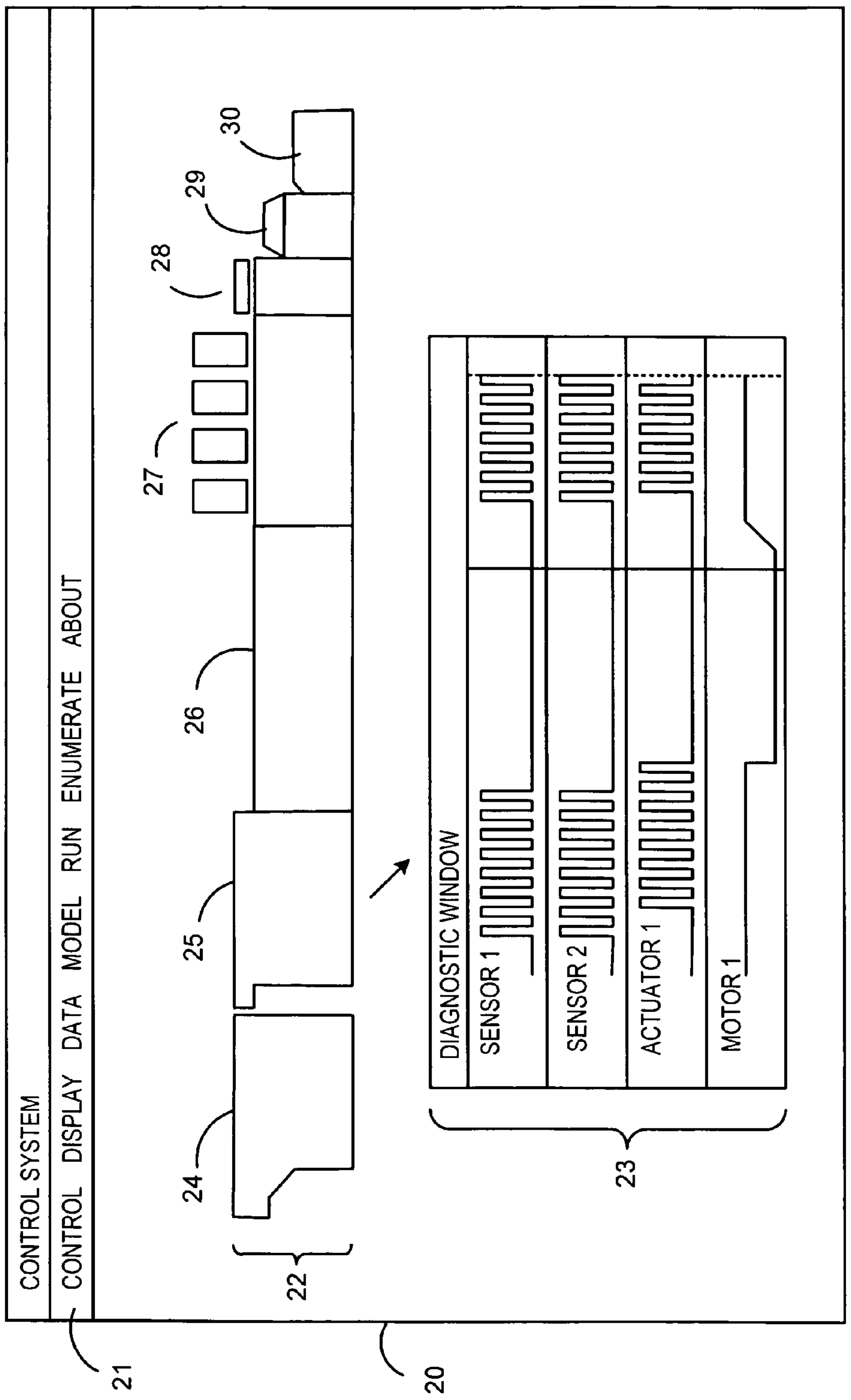
FIG. 2 depicts an exemplary screen display of a preferred embodiment of a logic analyzer output.

FIG. 2 depicts an exemplary display screen 20 for displaying the results of the logic analyzer 12. In this interactive display 20, various modules 24-30 of an exemplary inserter 22 are depicted graphically. The exemplary modules include a web cutter 24, an accumulator 25, a buffer 26, a chassis 27, an insert station 28, a scale and postage module 29 and an output stacker 30. This inserter 22 arrangement is exemplary and any arrangement of these or other modules may be present.

When the user selects one of the modules, a diagnostic window 23 displays the continuous readout of the integrated logic analyzer 12 for that particular module. In the example depicted, the diagnostic window 23 displays the status of sensors, components and control signals for the accumulator module 25. Diagnostic window 23 depicts horizontal read-outs for four operational characteristics of the module 25. The horizontal axis represents time, and the vertical axis represents data signals from the devices at a given time. In many embodiments, the read-outs will be a binary display of active or inactive status over a period of time as shown in FIG. 2. Display 20 also includes a menu 21 of tools that are available for further depiction and analysis of inserter 22.

Figure 3A:
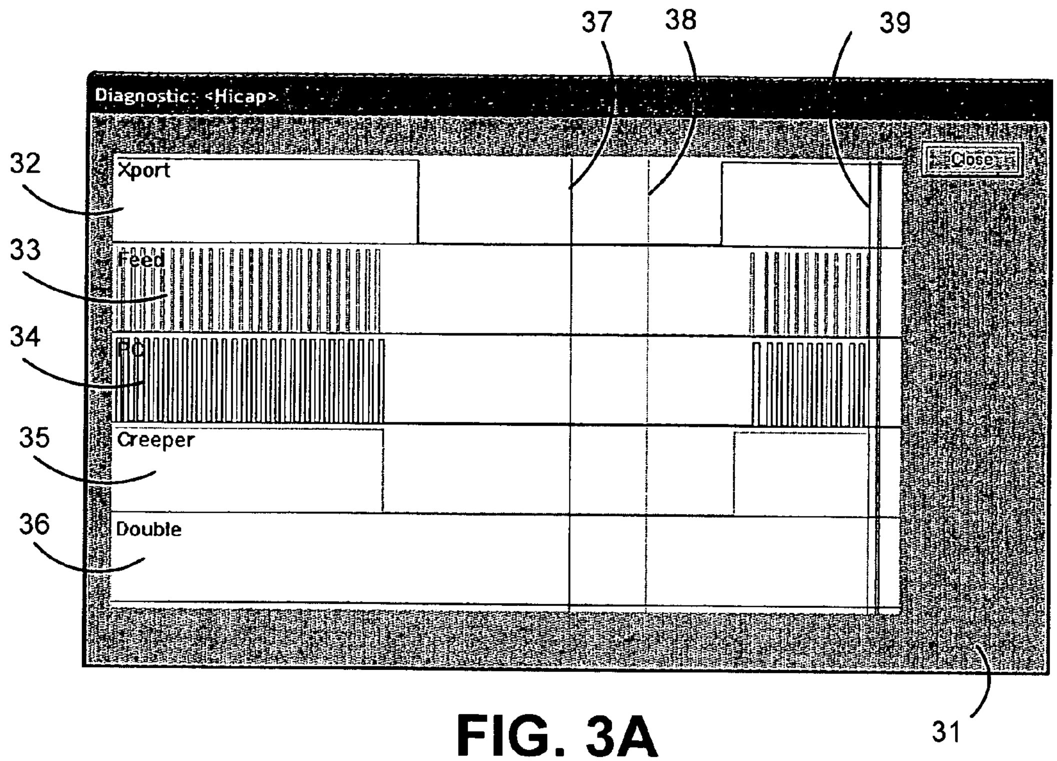
FIGS. 3A and 3B depict alternate embodiments of a logic analyzer display featuring a zoom capability.
Figure 3B:
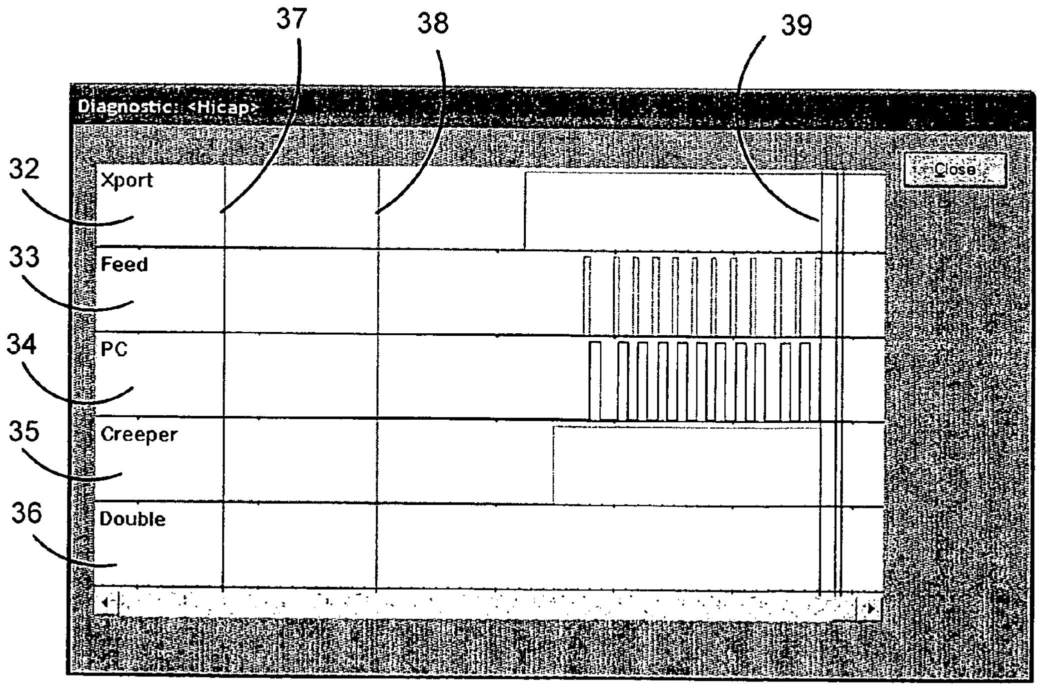

FIGS. 3A and 3B depict an exemplary diagnostic readout and a zooming functionality for adjusting a view of the diagnostic signals. Signals 32-36 are exemplary signals indicating sensor and component operation of a high capacity sheet feeder device. Vertical line 37 represents an error signal received while the feeder is inactive and the various signals are at a zero level. Vertical line 38 represents a control signal from controller 11 instructing the feeder to start feeding. Subsequent to the start signal 38 we can see the respective sensors and component signals 32-36 in respective operation. However, a problem occurs at the time of a second vertical error signal at line 39. After the error signal, the feeder stops operating again.

Since the area of interest for determining the source of the problem is at error signal 39, it is useful to zoom the view to focus on the time between start signal 37 and error signal 39. This ability to zoom in and out of the logic analyzer display helps to see fine details of the operation of the devices at a given time.

In a further embodiment, the various control signals 37-39 from the controller 11 are color coded to enhance readability of the display. In this example, the start signal 38 would be green, while the error signals 37 and 39 would be red.

Figure 4:
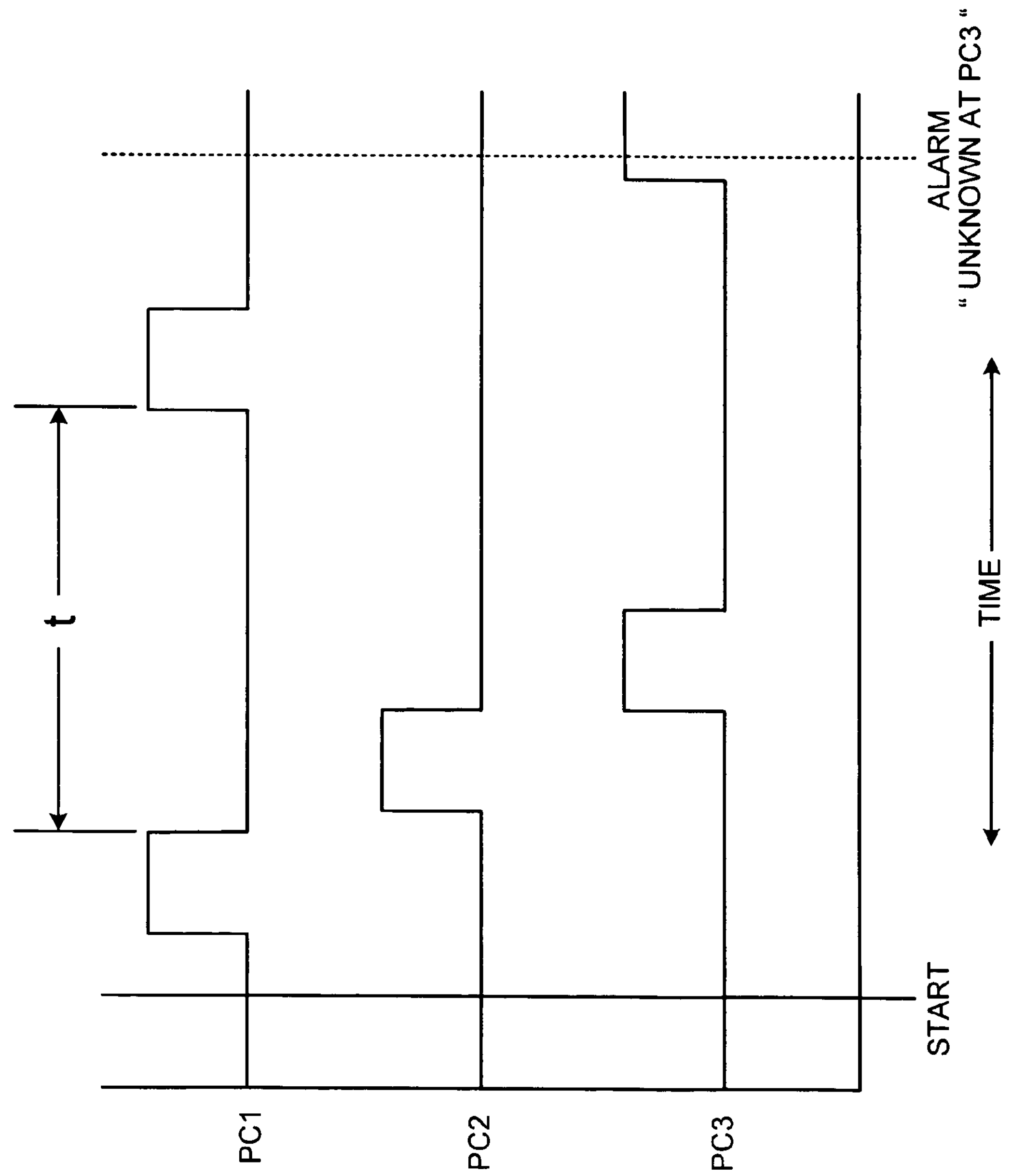
FIG. 4 depicts an exemplary set of logic analyzer data for an interpretation exercise.

FIG. 4 is an another exemplary logic analyzer display, for which an exemplary analysis will be described. This exemplary analysis is a simplified example of how the invention could be used, and it is not intended in any way to limit the invention to such simple applications. The invention is directed at the tools that assist in the analysis, but not necessarily to the particulars of the analysis itself, which may vary greatly.

In this example, signals PC1, PC2, and PC3 are photocell signals that detect the presence of a sheet of paper as it travels in the transport mechanism of an inserter machine. A sheet will normally pass by PC1, then PC2, and finally PC3. This normal state of operation is depicted in the first set of square waves on the left side of the graph.

At the right side of the graph an error occurs with the title, "UNKNOWN AT PC3." Without the integrated logic analyzer, all we might now is that PC3 has detected sheet that the controller had not expected to see. Using the integrated logic analyzer 12, however, we can look at the precise timing of the alarm and recreate the events leading to the problem.

From the exemplary signals in FIG. 4, we see that PC1 detected a second occurrence of a sheet, where that pattern did not hold true for PC2. This in itself is not cause for an alarm in the controller. However, when PC3 detected a sheet, without any corresponding sheet signal PC2, an error signal was triggered. From looking at this display, a service person can focus his or her efforts on figuring out why PC2 is not detecting a sheet at the expected time. Perhaps the sensor is faulty, or perhaps the sheet is moving in a way avoids normal detection, or perhaps the second peak at PC3 is caused by a different object than the second peak at PC1.

Finally, it might be of interest for the service person to know the precise timing of events in the diagram. For example, by measuring the time t between the peaks of the PC1 signal, a nominal time gap between sheets can be determined. It might be useful to compare the gap of PC1 to the gap of PC3 to determine whether something is causing the nominal gap to change in the interval between the sensors. Accordingly, the system provides a tool whereby the user can select any desired points on the horizontal axis, and to automatically provide a measurement of the corresponding interval. In this way the desired comparisons can be made in order to assist in the analysis of the problem.

Although the invention has been described with respect to preferred embodiments thereof, it will be understood by those skilled in the art that the foregoing and various other changes, omissions and deviations in the form and detail thereof may be made without departing from the spirit and scope of this invention.

What is claimed is:

1. An integrated logic analyzer system for an inserter machine, the system comprising:

- a plurality of sensors positioned within the inserter machine to provide a plurality of sensor signals indicating a condition of the machine at the sensor;
- a controller coupled to the plurality of sensors, the controller providing control signals for operation of the machine, the controller further generating error signals upon the occurrence of predetermined instances of sensor signals received from the plurality of sensors;
- a display controlled by the controller and indicating machine status based on the signals from the plurality of sensors;
- an integrated logic analyzer coupled to the controller and to the plurality of sensors, the integrated logic analyzer providing a continuous readout of sensor signals received from the sensors and control signals and status signals from the controller, the controller providing a representation of the continuous readout to the display.

2. The integrated logic analyzer system of claim 1 wherein the controller provides a visual representation of modules of the inserter system, and whereby the continuous readout for particular modules is individually selectable.

3. The integrated logic analyzer system of claim 1 wherein the integrated logic analyzer provides the continuous readout as a function of time on a horizontal axis.

4. The integrated logic analyzer system of claim 3 wherein the integrated logic analyzer provides vertical representations of machine status overlaying continuous readout.

5. The integrated logic analyzer system of claim 4 wherein the vertical representations of machine status include vertical lines representing machine start and an error signal.

6. The integrated logic analyzer system of claim 5 wherein the vertical lines representing machine start and the error signal are color coded.

7. The integrated logic analyzer system of claim 6 wherein the machine start vertical line is green and the error signal vertical line is red.

8. The integrated logic analyzer system of claim 3 wherein the controller and integrated logic analyzer further provide a tool for measuring between horizontal time points selected by an operator on the horizontal axis.

9. The integrated logic analyzer system of claim 1 wherein continuous readout of the integrated logic analyzer further includes a continuous readout of control signals from the controller.

10. The integrated logic analyzer system of claim 9 wherein the control signals in the continuous readout include at least one signal from a group control signals consisting of motor control signals or actuator control signals.

11. A method of using an integrated logic analyzer for an inserter machine, the inserter machine including a plurality of sensors, the method comprising:

- gathering in a processing device a plurality of sensor signals indicating a condition of the machine at the sensor;
- providing control signals using a controller for operation of the machine;
- generating error signals using the controller upon the occurrence of predetermined instances of gathered sensor signals;
- displaying machine status on a display based on the signals from the plurality of sensor signals;
- integrating the gathered plurality of sensor signals with the control signals and the error signals and providing a continuous readout of sensor signals, control signals and status signals using the integrated logic analyzer coupled to the controller; and
- displaying a visual representation of the continuous readout in relationship to the displayed machine status.

12. The method of using an integrated logic analyzer with an inserter machine of claim 11 further including displaying a visual representation of modules of the inserter system, and whereby the continuous readout for particular modules is individually selectable.

13. The method of using an integrated logic analyzer in an inserter machine of claim 11 further comprising providing the continuous readout as a function of time on a horizontal axis.

14. The method of using an integrated logic analyzer on an inserter machine of claim 13 further including a step of providing vertical representations of machine status overlaying continuous readout.

15. The method of using an integrated logic analyzer on an inserter machine of claim 14 wherein the step of providing vertical representations of machine status further includes vertical lines representing machine start and an error signal.

16. The method of using an integrated logic analyzer on an inserter machine of claim 15 further including a step of color coding the vertical lines representing the machine start signal and the error signal.

17. The method of using an integrated logic analyzer on an inserter machine of claim 16 wherein the machine start vertical line is green and the error signal vertical line is red.

18. The method of using an integrated logic analyzer on an inserter machine of claim 13 further including a step of providing a tool for measuring between time points selected by an operator on the horizontal axis.

19. The method of using an integrated logic analyzer on an inserter machine of claim 11 wherein the continuous readout of the integrated logic analyzer further includes a continuous readout of control signals.

20. The method of using an integrated logic analyzer on an inserter machine of claim 19 wherein the control signals in the continuous readout include at least one signal from a group control signals consisting of motor control signals or actuator control signals.

* * * * *